(12) United States Patent
Diouf et al.

(10) Patent No.: US 10,267,195 B2
(45) Date of Patent: Apr. 23, 2019

(54) CONVEYOR UNIT FOR CONVEYING A LIQUID

(71) Applicant: CONTINENTAL AUTOMOTIVE GMBH, Hannover (DE)

(72) Inventors: Cheikh Diouf, Silly-sur Nied (FR); Georges Maguin, Marly (FR); Philippe Mertes, Faulquemont (FR); Frèdèric Supernat, Dieuze (FR)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 15/496,123

(22) Filed: Apr. 25, 2017

(65) Prior Publication Data

US 2017/0226912 A1  Aug. 10, 2017

Related U.S. Application Data

(63) Continuation of application No. PCT/EP2015/074403, filed on Oct. 21, 2015.

(30) Foreign Application Priority Data

Oct. 31, 2014 (DE) .................... 10 2014 115 890

(51) Int. Cl.
F01N 3/00 (2006.01)
F01N 3/20 (2006.01)
B01D 53/94 (2006.01)

(52) U.S. Cl.
CPC ....... F01N 3/2066 (2013.01); B01D 53/9418 (2013.01); *B01D 2255/707* (2013.01); *F01N 2450/18* (2013.01); *F01N 2610/1433* (2013.01); *Y02T 10/24* (2013.01)

(58) Field of Classification Search
CPC .................... F01N 2450/18; F01N 2610/1433
See application file for complete search history.

(56) References Cited

U.S. PATENT DOCUMENTS

| 2005/0069468 A1* | 3/2005 | Huber ............... F01N 3/2066 422/172 |
| 2012/0224991 A1* | 9/2012 | Lipinski ............ F04C 2/084 418/166 |
| 2014/0245726 A1* | 9/2014 | Maguin ............. F01N 3/2066 60/310 |

FOREIGN PATENT DOCUMENTS

| CN | 101624990 A | 1/2010 |
| CN | 102654125 A | 9/2012 |
| CN | 104040127 A | 9/2014 |
| DE | 744795 C | 1/1944 |
| DE | 102009000101 A1 | 7/2010 |
| DE | 102011118652 A1 | 5/2013 |
| EP | 2143959 A1 | 1/2010 |

(Continued)

OTHER PUBLICATIONS

German Office Action dated Jul. 3, 2015 for corresponding German application 10 2014 115 890.3.

(Continued)

*Primary Examiner* — Audrey K Bradley
*Assistant Examiner* — Anthony Ayala Delgado

(57) ABSTRACT

The invention relates to a conveyor unit for conveying a liquid, comprising a distributor block made of plastic for the liquid-conducting connection of at least one component for conveying the liquid, the distributor block comprising at least one metallic clamping element which encloses the distributor block at least in some regions on the outside.

10 Claims, 2 Drawing Sheets

(56) References Cited

FOREIGN PATENT DOCUMENTS

| | | |
|---|---|---|
| JP | 2005511969 A | 4/2005 |
| KR | 20140084200 A | 7/2014 |
| WO | 2010078989 A1 | 7/2010 |
| WO | WO2013178307 A1 | 12/2013 |
| WO | 2014/057021 A1 | 4/2014 |

OTHER PUBLICATIONS

International Search Report and Written Opinion dated Oct. 21, 2015 from corresponding International Patent Application No. PCT/EP2015/074403.

* cited by examiner

CONVEYOR UNIT FOR CONVEYING A LIQUID

CROSS-REFERENCE TO RELATED APPLICATIONS

This application claims the benefit of PCT Application PCT/EP2015/074403, filed Oct. 21, 2015, which claims priority to German Application DE 10 2014 115 890.3, filed Oct. 31, 2014. The disclosures of the above applications are incorporated herein by reference.

FIELD OF THE INVENTION

The invention relates to a delivery unit for delivering a liquid, which delivery unit is in particular suitable for supplying a liquid additive for exhaust-gas purification to an exhaust-gas treatment device in a motor vehicle.

BACKGROUND OF THE INVENTION

Exhaust-gas treatment devices in which a liquid additive is required for exhaust-gas purification purposes are known in the automotive sector for example for reducing nitrogen oxide compounds in the exhaust gas of an internal combustion engine. In exhaust-gas treatment devices of this type, the method of selective catalytic reduction (SCR) is normally implemented. In this method, nitrogen oxide compounds in the exhaust gas of the internal combustion engine are reduced with the aid of ammonia. Ammonia is normally stored in motor vehicles not directly but rather in the form of a liquid exhaust-gas additive which is converted outside the exhaust gas or within the exhaust gas to form ammonia. A urea-water solution is particularly commonly used as a liquid exhaust-gas additive for this purpose. A 32.5% urea-water solution which is available under the trade name AdBlue® is particularly widely used.

A delivery unit is normally used for delivering liquid additive of this type to the exhaust-gas treatment device. A problem of such a delivery unit is that the liquid additive for the exhaust-gas purification can freeze at low temperatures. The urea-water solution described above, for example, freezes at −11° Celsius. In motor vehicles, such low temperatures may arise for example during long standstill phases in winter. When freezing occurs, the liquid additive undergoes a volume expansion, which may damage a delivery unit for delivering the liquid additive. Accordingly, it is necessary and advantageous for a delivery unit for delivering liquid additive to be constructed so as not to be destroyed by volume expansions that occur in the event of freezing.

It is known for compensation elements to be provided for compensating the ice pressure in a delivery unit. Such compensation elements are however additional components which make the structural design of a delivery unit for liquid additive more complicated.

SUMMARY OF THE INVENTION

Taking this prior art as a starting point, it is an object of the present invention to solve or lessen the technical problems described. It is sought in particular to describe a delivery unit for delivering a liquid or in particular for delivering a liquid additive for exhaust-gas purification, which delivery unit is of particularly simple construction.

This object is achieved by means of a delivery unit according to the features the present invention. Further advantageous design variants of the delivery unit are specified in the claims. The features specified individually in the claims may be combined with one another in any desired technologically meaningful way and may be supplemented by explanatory facts from the description, with further design variants of the invention being specified.

It is also sought to describe a delivery unit for delivering a liquid, having a distributor block, composed of plastic, for the liquid-conducting connection of at least one component for delivering the liquid, having at least one metallic clamping element which engages around the outside of the distributor block at least in regions.

A delivery unit for delivering a liquid for exhaust-gas purification may also be referred to as delivery module or as pump.

A delivery unit normally has various components that serve for the delivery of the liquid. These include primarily at least one pump, which performs the function of delivering the liquid. Furthermore, sensors, valves, electrical circuits, control units, drives and further components may be provided, by means of which the delivery is controlled, regulated or monitored.

To connect the various components, and in particular the hydraulic components of a delivery unit, to one another in liquid-conducting fashion, and in order to provide a delivery path for liquid through the delivery unit from an intake point to a discharge point, a distributor block is provided which connects the various components of the delivery unit to one another. In the distributor block there may for example be provided ducts through which the liquid flows, which ducts connect the components of the delivery unit to one another and, at least in sections, form the delivery path.

It is particularly advantageous for the distributor block to be composed of plastic. The distributor block is for example composed of polyethylene (PE, in particular HD-PE (high density polyethylene)) or polyoxymethylene (POM). A distributor block composed of plastic is particularly easy and inexpensive to produce, for example by means of an injection moulding process. When producing the distributor block by means of an injection moulding process, ducts are directly integrally cast into the distributor block of the delivery unit at the same time. However, a distributor block composed of plastic often does not exhibit enough mechanical stability to be adequately stable even under varying pressures that arise during the delivery of a liquid. In particular, pressure pulses that arise as a result of the operation of a pump may deform the delivery block and thus impair the functional capability of a delivery unit.

In the case of the delivery unit described here, a metallic clamping element is provided around the outside of the distributor block composed of plastic, which metallic clamping element imparts high mechanical strength to the distributor block, and in particular ensures that the distributor block and components of the distributor block do not become detached from one another when an elevated pressure of the liquid arises within the delivery unit. A clamping element of this type represents a particularly simple method for retroactively externally reinforcing a distributor block composed of plastic, without the need for additional complicated assembly steps for this purpose, and without the need for providing special stiffening structures in the distributor block itself.

The delivery unit is particularly advantageous if the distributor block is of U-shaped form and has a main body and two legs, and wherein at least one component for delivering the liquid is a pump which is arranged between the two legs of the distributor block, wherein the two legs are braced against one another by means of the metallic clamping element. Such an arrangement of a pump between two legs of the distributor block makes it possible for the pump to be clamped in a particularly secure manner. Pressure pulses generated in the liquid by the pump may generally push the two legs of the distributor block apart. This is a problem in particular because the distributor block is composed of plastic and therefore does not exhibit particularly high inherent stiffness. For this reason, it is particularly advantageous to use a metallic clamping element to clamp the two legs against one another externally. The clamping element is particularly preferably arranged such that the clamping force exerted on the distributor block by the clamping element is parallel to the direction of action of pressure pulses generated by the pump. The direction of action of pressure pulses is normally parallel to the orientation of the delivery path in the region of a liquid outlet of the pump.

Within the legs of the distributor block there are preferably provided ducts, wherein it is preferably the case that one leg has ducts through which the pump draws in liquid, and a further leg has ducts through which the pump discharges or outputs liquid.

The delivery unit is furthermore advantageous if the metallic clamping element is a spring which permits a deformation of the distributor block if an ice pressure is generated by freezing liquid in liquid-conducting ducts in the distributor block.

It has already been described further above that liquid freezing in the distributor block causes a volume expansion which may damage the delivery unit. By virtue of the fact that the clamping element is a spring which permits a deformation of the distributor block when an ice pressure is generated in liquid-conducting ducts in the distributor block by freezing liquid, it is possible for additional space to be created in the liquid-conducting ducts owing to the ice pressure, which additional space receives the volume expansion during the freezing process, such that destruction of the delivery unit is prevented.

The delivery unit is furthermore advantageous if the distributor block has a main body and at least one leg which is connected to the main body by way of at least one plug-in connection.

A plug-in connection for the connection of a main body of the distributor block and of a leg of the distributor block is a particularly simple connection which is assembled with little assembly outlay but which is not suitable for resisting high pressures within a duct in the distributor block. A plug-in connection is used for connecting a leg to a main body of a distributor block preferably only if the connection has running through it only ducts in which low liquid pressures arise. In particular, ducts which are arranged upstream of the pump, in front of the pump as viewed in the delivery direction, may run through the connection of legs that are assembled on a main body by way of plug-in connections.

Such ducts upstream of the pump may also be referred to as suction ducts or as low-pressure ducts. Plug-in connections are also suitable for the connection of legs or of sections to the distributor block if no ducts run through the connection.

The delivery unit is furthermore advantageous if the distributor block has a main body and at least one leg which is connected to the main body by way of at least one screw connection.

Screw connections for connecting legs to a main body of a distributor block are advantageous in particular when the connection has running through it ducts in which high liquid pressures arise. In particular, ducts which are arranged downstream of the pump, behind the pump as viewed in the delivery direction may run through the connection of legs that are assembled on a main body by way of screw connections. Such ducts downstream of the pump may also be referred to as pressure ducts or even as high-pressure ducts.

It has been found that plug-in connections are not suitable for connecting highly pressurized duct sections of a duct of a delivery unit to one another in liquid-tight fashion. Therefore, it is advantageous for inexpensive plug-in connections, which are relatively easy to assemble, to be used for the connection of legs with low-pressure ducts to a distributor block, whereas screw connections are used for the connection of legs with high-pressure ducts to a distributor block.

The delivery unit is furthermore particularly advantageous if the distributor block has at least one receptacle for force-transmitting fixing of the at least one clamping element.

Such a receptacle may for example be a depression on the outside of the distributor block, into which depression a section of the clamping element engages. Such a depression may for example be sloped in one direction in order to permit simplified mounting of the clamping element on the distributor block. A receptacle of this type preferably also has a section which the clamping element or a section of the clamping element hooks onto such that the clamping element is fixed permanently and securely to the distributor block.

The delivery unit is furthermore advantageous if the delivery unit has a housing in which the distributor block together with the at least one component is arranged.

The distributor block is protected against external influences by a housing of this type. A housing of this type with a delivery unit therein is for example inserted into a tank base of a tank for a liquid additive for exhaust-gas purification, and extracts liquid additive from the tank via a suction point arranged on the housing and supplies the liquid additive at a supply port. A housing preferably has mounting points to which the described distributor block of the delivery unit is fastened so as to be securely fixed to the housing. The distributor block preferably bears directly against the housing in the region of the suction point, and the distributor block particularly preferably has a duct which seals off against the housing in liquid-tight fashion at the suction point.

The delivery unit is furthermore advantageous if the metallic clamping element is composed of a wire and has at least one prestressed section.

A wire permits particularly simple manufacture of a metallic clamping element. A prestressed section may for example be a pre-bent section with an enhanced bend which is reduced again slightly by virtue of the clamping element being mounted onto the distributor block, and which thus imparts a prestress to the distributor block. This makes it possible for a highly effective clamping element to be provided in a particularly simple manner.

It is also the intention here to describe a motor vehicle having an internal combustion engine, having an exhaust-gas treatment device with an SCR catalytic converter for the purification of the exhaust gases of the internal combustion engine, and having at least one described delivery unit for delivering a liquid for exhaust-gas purification to the exhaust-gas treatment device.

The described delivery unit is suitable in particular for the delivery of liquid additives for exhaust-gas purification, because liquid additives for exhaust-gas purification may freeze at regular intervals and because the described delivery unit exhibits particularly high reliability against being damaged by volume expansion during the freezing process.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The invention and the technical field will be explained in more detail below on the basis of the figures. In particular, it should be noted that the figures are merely schematic, and in particular, the proportions illustrated in the figures are merely schematic. The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
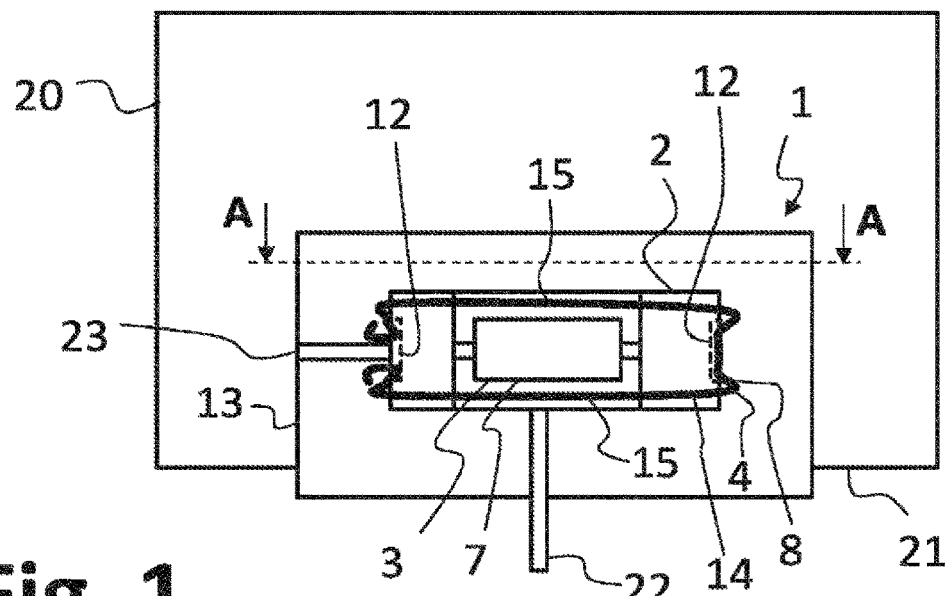
FIG. 1 is a side view of a delivery unit, according to embodiments of the present invention.

FIG. 1 shows a delivery unit 1 which is inserted into a tank 20 for a liquid. The delivery unit 1 has a housing 13 in which a distributor block 2 is situated. A pump 7 for delivering the liquid is fastened, as active component 3 of the delivery unit 1, to the distributor block 2. The pump 3 extracts liquid from the tank 20 at a suction point 23, and supplies the liquid at a supply port 22. The delivery unit 1 is inserted into a tank base 21 of the tank 20. The distributor block 2 of the delivery unit 1 is surrounded by a clamping element 4, the latter being in the form of a spring 8 and being manufactured from a wire 14 and having two prestressed sections 15. The prestressed sections 15 ensure that the clamping element 4 exerts a force on the distributor block 2 and thus braces the distributor block 2.

Figure 2:
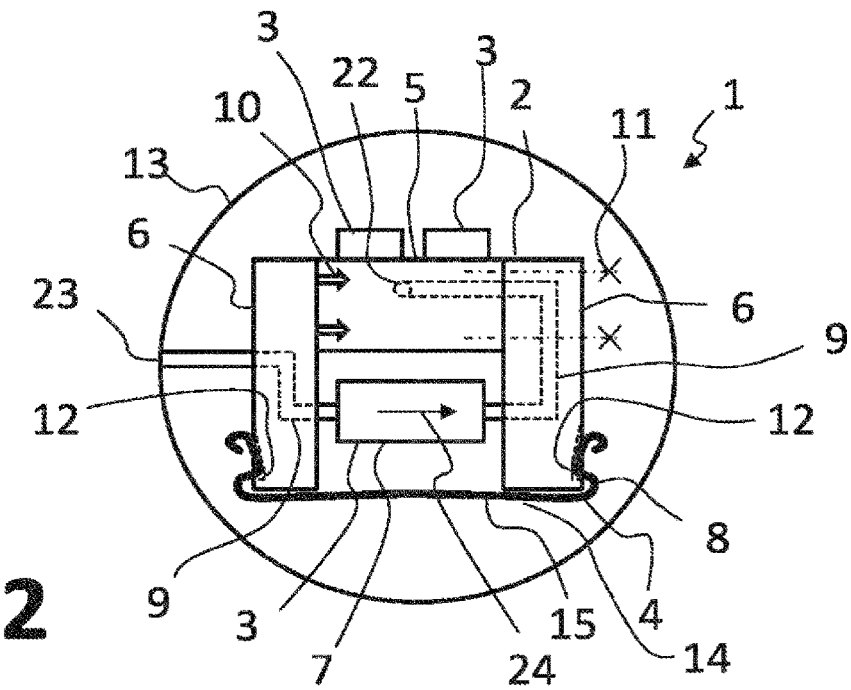
FIG. 2 is a sectional view taken along lines A-A of FIG. 1.

FIG. 2 shows the section A-A, already indicated in FIG. 1, through the delivery unit 1 shown in FIG. 1. Here, too, it is possible to see the housing 13 with the distributor block 2 arranged therein, on which distributor block the pump 7, as component 3, is situated. Also indicated at the pump 7 is a delivery direction 24 in which the liquid is delivered by the delivery unit 1 from the intake point 23 to the supply port 22. Also indicated is a duct 9 along which the liquid flows through the delivery unit 1. It may be seen that a low-pressure region is formed upstream of the pump as viewed along the delivery direction 24 of the duct 9, and a high-pressure region is formed downstream (that is to say behind the pump 7) as viewed in the delivery direction 24. Owing to the pressure increase generated by the pump 7, elevated liquid pressures prevail in the high-pressure region.

It is also possible to see the described clamping element 4, which is in the form of a spring 8 composed of wire 14 with prestressed sections 15 and which engages around the distributor block 2 at the outside. Here, the distributor block 2 is formed with a main body 5 and with two legs 6, wherein the left-hand leg 6 forms a low-pressure region of the duct 9 and is plugged onto the main body 5 by way of a plug-in connection, whereas the right-hand leg 6 forms a high-pressure region of the duct and is screwed to the main body 5 by way of a screw connection 11. In addition to the pump 7 as component 3, the illustration here also schematically shows two further components 3 in the upper region of the distributor block 2, which further components may for example be a valve or a sensor.

Figure 3:
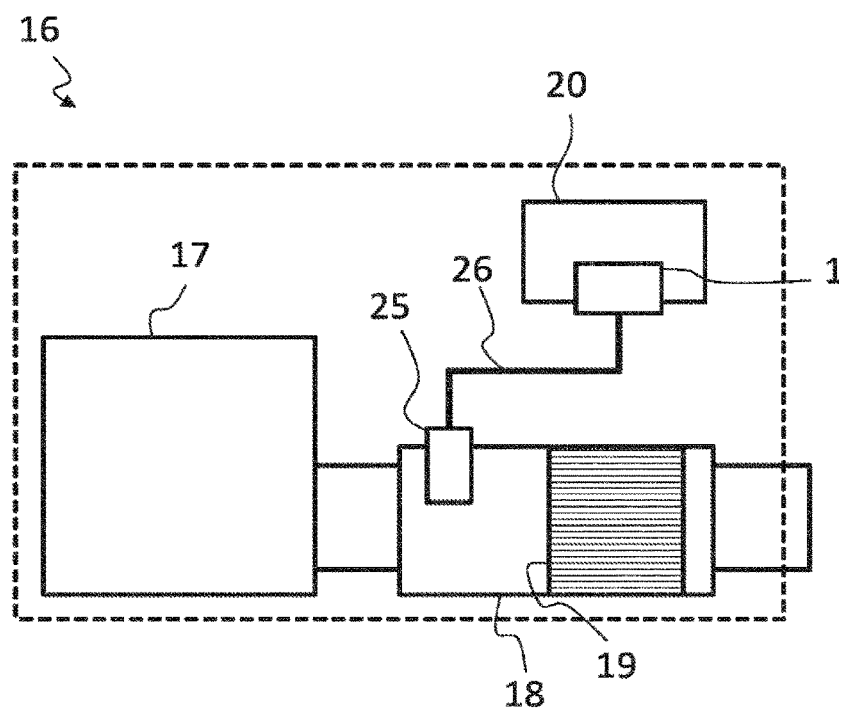
FIG. 3 is a diagram of a motor vehicle having a delivery unit, according to embodiments of the present invention.

FIG. 3 shows a motor vehicle 16 having an internal combustion engine 17 and having an exhaust-gas treatment device 18 with an SCR catalytic converter 19. A liquid additive for exhaust-gas purification may be supplied to the exhaust-gas treatment device 18 by way of an injector 25, with liquid additive for exhaust-gas purification being supplied to the injector from a tank 20, via a line 26, by a delivery unit 1.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A delivery unit for delivering a liquid, comprising:
   a distributor block;
   at least one component in fluid communication with the distributor block; and
   at least one spring which surrounds the outside of the distributor block;
   wherein the at least one component transfers liquid, and the at least one spring permits a deformation of the distributor block if ice pressure is generated by freezing liquid in liquid-conducting ducts in the distributor block.

2. The delivery unit of claim 1, wherein the distributor block is made of plastic.

3. The delivery unit of claim 1, the distributor block further comprising:
   a main body; and
   at least two legs, the at least two legs being braced against one another by the at least one spring;
   wherein the at least one component for delivering the liquid is a pump which is arranged between the two legs of the distributor block.

4. The delivery unit of claim 3, wherein the position of the main body and the at least two legs configures the distributor block to have a U-shaped form.

5. The delivery unit according to claim 3, further comprising a plurality of plug-in connections, wherein each of the at least two legs are connected to the main body by a corresponding one of the plurality of plug-in connections.

6. The delivery unit according to claim 3, further comprising a plurality of screw connections, wherein each of the at least two legs are connected to the main body by a corresponding one of the plurality of screw connections.

7. The delivery unit according to claim 1, the distributor block further comprising at least one receptacle for force-transmitting fixing of the at least one spring.

8. The delivery unit according to claim 1, the delivery unit further comprising a housing, wherein the distributor block together with the at least one component are arranged in the housing.

9. A motor vehicle having an internal combustion engine, comprising;
   an exhaust-gas treatment device;

an SCR catalytic converter for the purification of the exhaust gases of the internal combustion engine, the SCR catalytic converter being part of the exhaust-gas treatment device; and at least one delivery unit for delivering a liquid for exhaust-gas purification to the exhaust-gas treatment device;

a distributor block;

at least one component in fluid communication with the distributor block; and at least one spring which surrounds the outside of the distributor block;

wherein the at least one component transfers liquid to the exhaust-gas treatment device, and the spring permits a deformation of the distributor block if ice pressure is generated by freezing liquid in liquid-conducting ducts in the distributor block.

10. The motor vehicle having an internal combustion engine of claim 9, the distributor block further comprising:

a main body; and at least two legs, the at least two legs being braced against one another by the at least one spring;

wherein the at least one component for delivering the liquid is a pump which is arranged between the two legs of the distributor block.

* * * * *